United States Patent
Na et al.

(10) Patent No.: US 10,908,437 B2
(45) Date of Patent: Feb. 2, 2021

(54) OPTICAL MODULATOR USING PHASE CHANGE MATERIAL AND DEVICE INCLUDING THE SAME

(71) Applicant: SAMSUNG ELECTRONICS CO., LTD., Suwon-Si (KR)

(72) Inventors: Byunghoon Na, Suwon-si (KR); Yonghwa Park, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 542 days.

(21) Appl. No.: 15/674,103

(22) Filed: Aug. 10, 2017

(65) Prior Publication Data
US 2018/0046056 A1    Feb. 15, 2018

(30) Foreign Application Priority Data

Aug. 10, 2016 (KR) .................. 10-2016-0101887
Nov. 21, 2016 (KR) .................. 10-2016-0154888

(51) Int. Cl.
*G02F 1/01* (2006.01)
*G02F 1/03* (2006.01)
(Continued)

(52) U.S. Cl.
CPC .......... *G02F 1/0147* (2013.01); *G02F 1/0553* (2013.01); *G02F 1/21* (2013.01);
(Continued)

(58) Field of Classification Search
CPC ...... G02F 1/1523; G02F 1/1533; G02F 1/155; G02F 1/0102; G02F 1/163; G09G 3/16
(Continued)

(56) References Cited

U.S. PATENT DOCUMENTS 5,148,298 A    9/1992   Shigeta et al.
7,522,029 B1   4/2009   Lantz
(Continued)

FOREIGN PATENT DOCUMENTS

EP    3007359 A1    4/2016
JP    7-104524 B2   11/1995
(Continued)

OTHER PUBLICATIONS

Ryotaro Ozaki et al., "Electrically color-tunable defect mode lasing in one-dimensional photonic-band-gap system containing liquid crystal", Applied Physics Letters, vol. 82, No. 21, May 26, 2003, (3 pages Total).

(Continued)

*Primary Examiner* — Dawayne Pinkney
(74) *Attorney, Agent, or Firm* — Sughrue Mion, PLLC

(57) ABSTRACT

Provided are optical modulators and devices including the optical modulators. The optical modulator may include an optical modulation layer that includes a phase change material. A first electrode may be provided on a first surface of the optical modulation layer. A second electrode may be provided on a second surface of the optical modulation layer. A first phase controlling layer may be provided, the first electrode being disposed between the first phase controlling layer and the optical modulation layer. A second phase controlling layer may be provided, the second electrode being disposed between the second phase controlling layer and the optical modulation layer. Each of the first and the second phase controlling layers may have an optical thickness corresponding to an odd multiple of λ/4, where λ is a wavelength of incident light to be modulated by the optical modulator. The optical modulator may further include at least one reflective layer. The optical modulation layer may (Continued)

have a thickness of about 10 nm or less. An operating voltage of the optical modulator may be about 10 V or less.

33 Claims, 11 Drawing Sheets

(51) Int. Cl.
| | |
|---|---|
| G02F 1/15 | (2019.01) |
| G09G 3/38 | (2006.01) |
| H04N 9/16 | (2006.01) |
| G02F 1/21 | (2006.01) |
| G02F 1/055 | (2006.01) |
| H04B 10/548 | (2013.01) |
| H04B 10/67 | (2013.01) |
| H04B 10/80 | (2013.01) |
| G02F 1/015 | (2006.01) |

(52) U.S. Cl.
CPC ........... *H04B 10/548* (2013.01); *H04B 10/67* (2013.01); *H04B 10/80* (2013.01); *G02F 2001/0151* (2013.01); *G02F 2201/346* (2013.01); *G02F 2202/00* (2013.01); *G02F 2202/32* (2013.01); *G02F 2203/50* (2013.01)

(58) Field of Classification Search
USPC ........ 359/279, 265–275, 277, 245–247, 242; 345/49, 105, 107; 250/70; 348/814, 817; 438/929; 349/182–186
See application file for complete search history.

(56) References Cited

U.S. PATENT DOCUMENTS

| | | | |
|---|---|---|---|
| 2005/0013000 A1* | 1/2005 | Uehara | G02F 1/0305 359/586 |
| 2005/0202204 A1* | 9/2005 | Nishihara | G11B 7/24038 428/64.4 |
| 2012/0218619 A1* | 8/2012 | Inoue | G02F 1/0305 359/263 |

FOREIGN PATENT DOCUMENTS

| | | |
|---|---|---|
| JP | 2009-86060 A | 4/2009 |
| KR | 10-2011-0074661 A | 7/2011 |
| WO | 2015/097468 A1 | 7/2015 |

OTHER PUBLICATIONS

Rossen Todorov et al., "Thin Chalcogenide Films for Photonic Applications", Photonic Crystals—Innovative Systems, Lasers and Waveguides, Institute of Optical Materials and Technologies "Acad. f. Malinowski" Bulgarian Academy of Sciences, Bulgaria, (2012), (26 Pages Total).

Mikhail A. Kats et al., "Ultra-thin perfect absorber employing a tunable phase change material", Applied Physics Letters, 2012 American Institute of Physics, vol. 101, No. 22, 221301,(2012), (5 Pages Total).

Carlos Rios et al., "Color Depth Modulation and Resolution in Phase-Change Material Nanodisplays", Advanced Materials, (2016), vol. 28, No. 23, (pp. 4720-4726).

Mohsen Jafari et al., "A 1550 NM Phase Change Electro-Optical Shutter", 2016 IEEE 29TH International Conference on Micro Electro Mechanical Systems (MEMS), IEEE, (2016), (4 Pages Total).

Xi Wang et al., "Tunable Bragg filters with a phase transition material defect layer", Research Article, Optics Express 20365, vol. 24, No. 18, (2016), (8 Pages Total).

Communication dated Dec. 15, 2017, from the European Patent Office in counterpart European Application No. 17183388.2.

Chain-Ming Lee et al., "Optical Properties of $Ge_{40}Sb_{10}Te_{50}Bx$ (x =0–2) Films", Jpn. J. Appl. Phys. vol. 38 (1999), Part 1, No. 11, Nov. 1999, (pp. 6369-6371).

Joshua Hendrickson et al., "Electro-optical 1 x 2, 1 x N and N x N fiber-optic and free-space switching over 1.55 to 3.0 μm using a Ge—$Ge_2Sb_2Te_5$—Ge prism structure", Optics Express 72, 2015 OSA, vol. 23, No. 1, Jan. 12, 2015, (14 Pages Total), DOI:10.1364/OE.23.000072.

Yiguo Chen et al., "Engineering the Phase Front of Light with Phase-Change Material Based Planar lenses", Scientific Reports 5, Article No. 8660 (2015), (18 Pages Total), doi:10.1038/srep08660.

Tsung Sheng Kao et al., "Controlling the near-field excitation of nano-antennas with phase-change materials", Beilstein Journal of Nanotechnology, 2013, 4, (pp. 632-637), doi:10.3762/bjnano.4.70.

Peiman Hosseini et al., "An optoelectronic framework enabled by low-dimensional phase-change films", Letter Research, Nature, vol. 511, Jul. 10, 2014, (pp. 206-211), doi:10.1038/nature13487.

E. M. Vinod et al., "Structural transition and enhanced phase transition properties of Se doped $Ge_2Sb_2Te_5$ alloys", Scientific Reports, 5 : 8050, (7 Pages total), DOI: 10.1038/srep08050, Jan. 30, 2015.

* cited by examiner

OPTICAL MODULATOR USING PHASE CHANGE MATERIAL AND DEVICE INCLUDING THE SAME

CROSS-REFERENCE TO RELATED APPLICATIONS

This application claims priority from Korean Patent Application No. 10-2016-0101887, filed on Aug. 10, 2016, and Korean Patent Application No. 10-2016-0154888, filed on Nov. 21, 2016, in the Korean Intellectual Property Office, the disclosures of which are incorporated herein in their entireties by reference.

BACKGROUND

1. Field

The present disclosure relates to optical modulators and devices including the optical modulators.

2. Description of the Related Art

Three-dimensional (3D) cameras are capable of measuring a distance from a plurality of points on a surface of an object to the 3D camera, in addition to having a photographing function. Various algorithms to measure a distance between an object and a 3D camera have been suggested and a Time-of-Flight (TOF) method is mainly in use. The TOF method is a method of measuring a flight time after illumination light is irradiated to an object and until the illumination light reflected from the object is received by a light receiving unit. The flight time of illumination light may be obtained by measuring a phase delay of the illumination light, and an optical modulator is used for this purpose.

An optical modulator according to the related art is manufactured by a crystal growth method of growing crystals of group III-V compound semiconductors on a gallium arsenide (GaAs) substrate. The group III-V compound semiconductor based optical modulator has a P-I-N diode structure in which a multiple quantum well (MQW) structure is arranged between a P-electrode and an N-electrode. However, in the group III-V compound semiconductor-based optical modulator, due to a thick absorption layer of about several micrometers or more and a complex stacked structure for improving performance, manufacturing process may become more complex, reproducibility of a device may be lowered, and manufacturing costs may be increased.

SUMMARY

Provided are optical modulators using a phase change material.

Provided are optical modulators having a relatively simple structure and excellent performance.

Provided are optical modulators which may reduce the thickness of an optical modulation layer.

Provided are optical modulators which may reduce an operating voltage.

Provided are optical modulators which may secure a high light modulation rate and a high contrast ratio (e.g., demodulation contrast).

Provided are devices/apparatuses including the optical modulators.

Additional aspects will be set forth in part in the description which follows and, in part, will be apparent from the description, or may be learned by practice of the presented exemplary embodiments.

According to an aspect of an exemplary embodiment, an optical modulator may include an optical modulation layer including a phase change material; a first electrode disposed on a first surface of the optical modulation layer; a second electrode disposed on a second surface of the optical modulation layer; a first phase controlling layer, the first electrode being disposed between the first phase controlling layer and the optical modulation layer; a second phase controlling layer, the second electrode being disposed between the second phase controlling layer and the optical modulation layer; and at least one reflective layer. A center wavelength of incident light to be modulated may be $\lambda$. Each of the first and the second phase controlling layers may have an optical thickness corresponding to an odd multiple of $\lambda/4$. The optical modulator may be configured to modulate the incident light by a change in optical properties of the optical modulation layer based on a phase change of the phase change material.

The optical modulation layer may include a thickness of 10 nm or less.

The optical modulation layer may include a thickness of 7 nm or less.

The optical modulator may be configured to operate at an operating voltage of 10 V or less.

The optical modulator may be configured to operate at an operating voltage of 5 V or less.

The phase change material may include $Ge_{40}Sb_{10}Te_{50}$.

At least one from among the first and the second electrodes may include a transparent conductive oxide (TCO).

An overall optical thickness of the optical modulation layer and the first and the second electrodes may satisfy a condition of an integer multiple of $\lambda/2$.

At least one from among the first and the second phase controlling layers may include one from among $TiO_2$, $SiO_2$, SiNx, $Al_2O_3$, AlN, $HfO_2$, SiC, and MgO.

The at least one reflective layer may include at least one from among a first distributed Bragg reflector (DBR) and a second DBR. The first phase controlling layer may be disposed between the first DBR and the optical modulation layer. The second phase controlling layer may be disposed between the second DBR and the optical modulation layer.

At least one from among the first DBR and the second DBR may have a stacked structure in which a first material layer, which has a first refractive index, and a second material layer, which has a different refractive index, are alternatingly stacked.

The optical modulator may further include a substrate that is transparent to incident light. The first phase controlling layer, the first electrode, the optical modulation layer, the second electrode, and the second phase controlling layer are sequentially stacked on the substrate.

The optical modulator may be a transmissive optical modulator using a transmittance change according to the phase change of the phase change material.

A transmittance change amount of the optical modulator may be 40% or more.

A transmittance change amount of the optical modulator may be 50% or more.

A demodulation contrast (D.C.) of the optical modulator may be 70% or more.

The D.C. of the optical modulator may be 80% or more.

According to an aspect of an exemplary embodiment, an optical apparatus may include the optical modulator defined above.

According to an aspect of an exemplary embodiment, a three-dimensional (3D) image acquiring device may include a light source unit configured to emit light to an object, an optical modulation unit configured to modulate light reflected from the object and including the optical modulator defined above, and a light detection unit configured to detect light modulated by the optical modulation unit.

According to an aspect of an exemplary embodiment, an optical modulator may include an optical modulation layer including a phase change material; a first electrode disposed on a first surface of the optical modulation layer; a second electrode disposed on a second surface of the optical modulation layer; a first phase controlling layer, the first electrode being disposed between the first phase controlling layer and the optical modulation layer; and a second phase controlling layer, the second electrode being disposed between the second phase controlling layer and the optical modulation layer. A center wavelength of incident light to be modulated by the optical modulator may be $\lambda$. Each of the first and the second phase controlling layers may have an optical thickness corresponding to an odd multiple of $\lambda/4$, and an overall optical thickness of the optical modulation layer and the first and the second electrodes may be an integer multiple of $\lambda/2$. The optical modulator is configured to modulate the incident light by a change in optical properties based on a phase change of the phase change material.

A thickness of the optical modulation layer may range from 10 nm to 40 nm.

The phase change material may include $Ge_{40}Sb_{10}Te_{50}$.

At least one from among the first and the second electrodes may include a transparent conductive oxide (TCO).

At least one from among the first and the second phase controlling layers may include one from among $TiO_2$, $SiO_2$, $SiN_x$, $Al_2O_3$, AlN, $HfO_2$, SiC, and MgO.

The optical modulator may further include at least one from among a first distributed Bragg reflector (DBR), the first phase controlling layer being disposed between the first DBR and the optical modulation layer, and a second DBR arranged to face the optical modulation layer, the second phase controlling layer being disposed between the second DBR and the optical modulation layer.

The optical modulation layer may have a thickness of 10 nm or less.

The optical modulation layer may have a thickness of 7 nm or less.

An operating voltage of the optical modulator may be 10 V or less.

An operating voltage of the optical modulator may be 5 V or less.

A transmittance change amount of the optical modulator may be 40% or more.

A transmittance change amount of the optical modulator may be 50% or more.

A demodulation contrast (D.C.) of the optical modulator may be 70% or more.

A D.C. of the optical modulator may be 80% or more.

According to an aspect of an exemplary embodiment, an optical apparatus may include the optical modulator defined above.

According to an aspect of an exemplary embodiment, a 3D image acquiring device may include a light source unit configured to emit light to an object, an optical modulation unit configured to modulate light reflected from the object and including the optical modulator defined above, and a light detection unit configured to detect light modulated by the optical modulation unit.

According to an aspect of an exemplary optical modulator may include an optical modulation layer including a phase change material; a first electrode disposed below the optical modulation layer and configured to receive a specific voltage level; a second electrode disposed above the optical modulation layer and configured to receive the specific voltage level; a first phase controlling layer disposed below the first electrode; a second phase controlling layer disposed above the second electrode; and a reflective layer disposed below the first phase controlling layer. Each of the first phase controlling layer and the second phase controlling layer may have an optical thickness corresponding to an odd multiple of $\lambda/4$, where $\lambda$ is a center wavelength of incident light to be modulated by the optical modulator. The optical modulator may be configured to modulate the incident light by using a change in optical properties of the optical modulation layer according to a phase change of the phase change material.

The phase change material of the optical modulation layer may be a Ge—Sb—Te-based material.

The Ge—Sb—Te-based material may be expressed as $Ge_xSb_yTe_z$, where x, y, and z are positive integers and x>y, y<z, and x<z.

The Ge—Sb—Te-based material may be $Ge_{40}SbyTe_{50}$.

At least one from among the first electrode and the second electrode may include at least one from among a transparent conductive oxide (TCO), an indium tin oxide (ITO), an indium zinc oxide (IZO), and an aluminum zinc oxide (AZO).

The first phase controlling layer and the second phase controlling layer may be configured to match phases of the incident light.

At least one from among the first phase controlling layer and the second phase controlling layer may be a dielectric layer.

At least one from among the first phase controlling layer and the second phase controlling layer may include one from among TiO2, SiO2, SiNx, Al2O3, AlN, HfO2, SiC, and MgO.

The reflective layer may include a distributed Bragg reflector (DBR) structure, in which two material layers, which have different refractive indexes from each other, are alternatingly stacked.

The two material layers may include different dielectrics selected from a group consisting of TiO2, SiO2, SiNx, Al2O3, AlN, HfO2, SiC, and MgO.

Each of the two material layers may have an optical thickness corresponding to an integer multiple of $\lambda/4$.

BRIEF DESCRIPTION OF THE DRAWINGS

These and/or other aspects will become apparent and more readily appreciated from the following description of the exemplary embodiments, taken in conjunction with the accompanying drawings in which.

DETAILED DESCRIPTION

Figure 1:
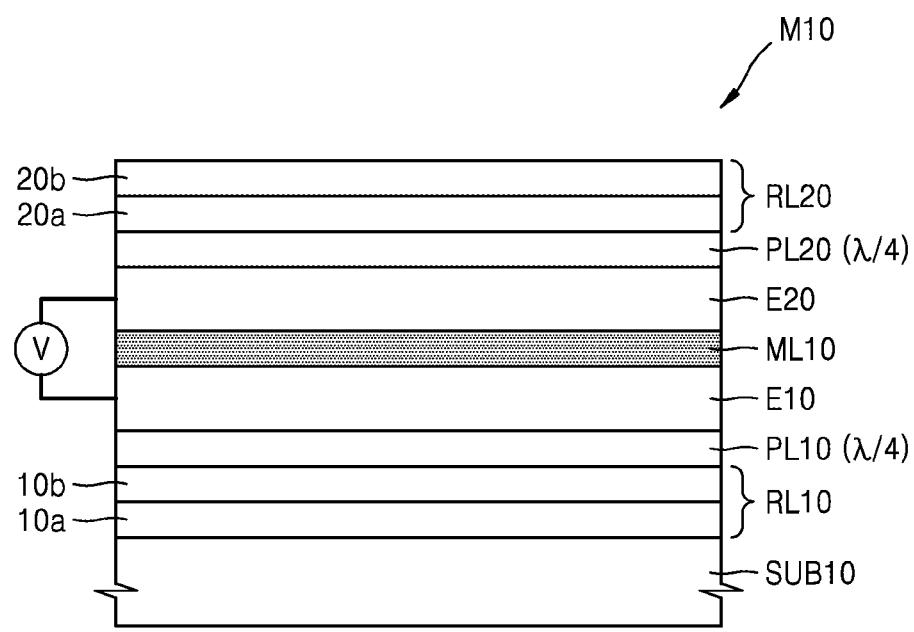
FIG. 1 is a cross-sectional view of an optical modulator according to an exemplary embodiment.

Various example embodiments will now be described more fully with reference to the accompanying drawings in which example embodiments are shown.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein the term "and/or" includes any and all combinations of one or more of the associated listed items.

It will be understood that, although the terms "first," "second," etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of example embodiments.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of example embodiments. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of example embodiments. The word "exemplary" is used herein to mean "serving as an example or illustration." Any aspect or design described herein as "exemplary" is not necessarily to be construed as preferred or advantageous over other aspects or designs.

Unless otherwise defined, all terms (including technical and scientific terms) used herein have the same meaning as commonly understood by one of ordinary skill in the art to which example embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

Hereinafter, optical modulators according to exemplary embodiments and devices/apparatuses including the optical modulator will be described in detail with reference to the accompanying drawings. The width and thickness of layers or regions illustrated in the accompanying drawings may be somewhat exaggerated for clarity and convenience of description. Like reference numerals denote like elements throughout the specification.

FIG. 1 is a cross-sectional view of an optical modulator M10 according to an exemplary embodiment.

Referring to FIG. 1, the optical modulator M10 may include an optical modulation layer ML10 including a phase change material and electrodes E10 and E20 for applying a voltage to the optical modulation layer ML10. A first electrode E10 and a second electrode E20 may be respectively provided on a first surface, for example, a lower surface of the optical modulation layer ML10, and a second surface, for example, an upper surface of the optical modulation layer ML10. The first electrode E10 and the second electrode E20 may be connected to a certain voltage application apparatus V, and change a phase of a phase change material by applying a voltage to the optical modulation layer ML10. As the phase of a phase change material changes, optical properties of the optical modulation layer ML10 change, as described below in detail with reference to FIGS. 2 to 5.

The phase change material included in the optical modulation layer ML10 may be, for example, a Ge—Sb—Te based material. The Ge—Sb—Te based material may be expressed as $Ge_xSb_yTe_z$, where x, y, and z may be positive (+) integers. The x, y, and z may satisfy x>y, y<z, and x<z. In a detailed example, the phase change material may be $Ge_{40}Sb_{10}Te_{50}$. When the phase change material is used, high optical modulation properties and low voltage driving properties may be obtained.

At least one of the first and second electrodes E10 and E20 may include a transparent conductive oxide (TCO). In a detailed example, at least one of the first and second electrodes E10 and E20 may include a material selected from the group consisting of indium tin oxide (ITO), indium zinc oxide (IZO), aluminum zinc oxide (AZO), etc. For example, although both the first and second electrodes E10 and E20 may be ITO layers, this is exemplary and any electrode material that is transparent to incident light may be employed therefor. The thickness of each of the first and second electrodes E10 and E20 may be determined to be, for example, about several hundreds of nanometers (nm) or less, considering a refractive index of a material forming the electrode.

The optical modulator M10 may include a first phase controlling layer PL10 facing the optical modulation layer ML10 with the first electrode E10 therebetween. Furthermore, the optical modulator M10 may include a second phase controlling layer PL20 facing the optical modulation layer ML10 with the second electrode E20 therebetween. The first and second phase controlling layers PL10 and PL20 may be referred to as phase matching layers. When a target wavelength (e.g., center wavelength) of incident light to be modulated is λ, each of the first and second phase controlling layers PL10 and PL20 may have an optical thickness corresponding to an odd multiple of λ/4. In this case, the first and second phase controlling layers PL10 and PL20 may consequently improve optical modulation efficiency by matching phases of electromagnetic waves (light) that are transmitted through or reflected from the optical modulator M10. In other words, since the phases of the electromagnetic waves (light) that are transmitted through or reflected from the first and second phase controlling layers PL10 and PL20 match each other (e.g., the phase of the light transmitted through or reflected from the first phase controlling layer PL10 matches the phase of the light transmitted through or reflected from the second phase controlling layer PL20), the optical modulation efficiency may be greatly improved.

The first and second phase controlling layers PL10 and PL20 may be a dielectric layer. For example, at least one of the first and second phase controlling layers PL10 and PL20 may include one of $TiO_2$, $SiO_2$, $SiN_x$, $Al_2O_3$, AlN, $HfO_2$, SiC, and MgO. However, the materials suggested herein are exemplary and the materials of the first and second phase controlling layers PL10 and PL20 may be changed in various ways.

The optical modulator M10 may further include at least one of first and second reflective layers RL10 and RL20 arranged to face the optical modulation layer ML10. In FIG. 1, the first reflective layer RL10 is provided to face the optical modulation layer ML10 with the first phase controlling layer PL10 therebetween and the second reflective layer RL20 is provided to face the optical modulation layer ML10 with the second phase controlling layer PL20 therebetween. At least one of the first and second reflective layers RL10 and RL20 may have, for example, a distributed Bragg reflector (DBR) structure. When both the first and second reflective layers RL10 and RL20 have a DBR structure, the first reflective layer RL10 may be referred to as a first DBR, and the second reflective layer RL20 may be referred to as a second DBR. The first DBR, that is, the first reflective layer RL10, may have a structure in which two material layers having different refractive indexes (hereinafter, referred to as the first and second material layers 10a and 10b) are alternately and repeatedly stacked one or more times. Similarly, the second DBR, that is, the second reflective layer RL20, may have a structure in which two material layers having different refractive indexes (hereinafter, referred to as the third and fourth material layers 20a and 20b) are alternately and repeatedly stacked one or more times. Although the first and second material layers 10a and 10b are provided as one pair and the third and fourth material layers 20a and 20b are provided as one pair, they may have a stacked structure of two or more pairs. The first and second material layers 10a and 10b may be different dielectrics selected from the group consisting of, for example, $TiO_2$, $SiO_2$, $SiN_x$, $Al_2O_3$, AlN, $HfO_2$, SiC, and MgO. Similarly, the third and fourth material layers 20a and 20b may be different dielectrics selected from the group consisting of, for example, $TiO_2$, $SiO_2$, $SiN_x$, $Al_2O_3$, AlN, $HfO_2$, SiC, and MgO. The material of the third material layer 20a may be the same as the material of the second material layer 10b, and the material of the fourth material layer 20b may be the same as the material of the first material layer 10a. Furthermore, the material of the first material layer 10a may be the same as the material of the first phase controlling layer PL10, and the material of the fourth material layer 20b may be the same as the material of the second phase controlling layer PL20. Each of the first and second material layers 10a and 10b may have an optical thickness corresponding to an integer (e.g., positive integer) multiple of λ/4. Similarly, each of the third and fourth material layers 20a and 20b may have an optical thickness corresponding to an integer (e.g., positive integer) multiple of λ/4. The first phase controlling layer PL10 may be considered to constitute one DBR structure with the first and second material layers 10a and 10b. Similarly, the second phase controlling layer PL20 may be considered to constitute one DBR structure with the third and fourth material layers 20a and 20b.

According to an exemplary embodiment, an overall optical thickness of the optical modulation layer ML10 including the phase change material and the first and second electrodes E10 and E20 may satisfy a condition of an integer (e.g., positive integer) multiple of λ/2. In other words, the stacked structure of the optical modulation layer ML10 and the first and second electrodes E10 and E20 may have an optical thickness corresponding to an integer (e.g., positive integer) multiple of λ/2. In this case, the optical modulation layer ML10 and the first and second electrodes E10 and E20 may constitute one resonance structure or a cavity structure. The cavity structure may be referred to as the Fabry-Perot cavity structure.

The optical modulator M10 may include a substrate SUB10 that is transparent to incident light. For example, when incident light is in an infrared ray (IR) range, the substrate SUB10 may be, for example, a glass substrate, a GaAs substrate, or an indium phosphide (InP) substrate. Furthermore, the substrate SUB10 may be a dielectric film or a semiconductor film. Furthermore, the substrate SUB10 may be an organic (polymer) substrate. In this case, the substrate SUB10 may have flexible properties. However, the material of the substrate SUB10 is not limited to the above description and various other materials may be employed therefor. The first reflective layer RL10 and the second reflective layer RL20 that is apart from the first reflective layer RL10 are provided on the substrate SUB10. The optical modulation layer ML10 including the phase change material may be provided between the first reflective layer RL10 and the second reflective layer RL20. The first electrode E10 may be provided between the optical modulation layer ML10 and the first reflective layer RL10, and the second electrode E20 may be provided between the optical modulation layer ML10 and the second reflective layer RL20. The first phase controlling layer PL10 may be provided between the first electrode E10 and the first reflective layer RL10, and the second phase controlling layer PL20 may be provided between the second electrode E20 and the second reflective layer RL20.

In a detailed example, the optical modulator M10 may use a glass substrate having a thickness of about 500 μm as the substrate SUB10, and a $TiO_2$ layer 10a, a $SiO_2$ layer 10b, a $TiO_2$ layer PL10, a ITO layer E10, a $Ge_{40}Sb_{10}Te_{50}$ layer ML10, a ITO E20, a $TiO_2$ layer PL20, a $SiO_2$ layer 20a, and a $TiO_2$ layer 20b may be sequentially provided on the glass substrate. However, a combination of the above materials is merely exemplary and may be changed in various ways.

In the present exemplary embodiment, the optical modulation layer ML10 including the phase change material may have excellent optical modulation properties. Since the first and second phase controlling layers PL10 and PL20 and at least one of the reflective layers RL10 and RL20 are provided under and above the optical modulation layer ML10, the optical modulation layer ML10 may have excellent resonance properties and optical modulation properties thereof may be further improved. Accordingly, even when the thickness of the optical modulation layer ML10 decreases, excellent optical modulation properties may be obtained. For example, the thickness of the optical modulation layer ML10 may be about 10 nm or less or about 7 nm or less (e.g., 2-7 nm). As such, when the thickness of the optical modulation layer ML10 is thin, a driving voltage to induce optical modulation of the optical modulation layer ML10 may be quite low. Accordingly, an operating voltage of the optical modulator M10 may be about 10 V or less. For example, the operating voltage of the optical modulator M10 may be about 5 V or less. In some cases, the operating voltage of the optical modulator M10 may be about 3 V or less or about 2 V or less.

Furthermore, according to the present exemplary embodiment, the optical modulator M10 may be a device using a change in the transmittance according to the phase change of the phase change material. In this case, an amount of a change in the transmission of the optical modulator M10 may be as high as, for example, about 40% or more or about 50% or more. Furthermore, a demodulation contrast (D.C.) of the optical modulator M10 may be about 70% or more or about 80% or more. Accordingly, the optical modulator M10 having excellent optical modulation properties while having a small thickness and a simple stacked structure may be implemented. The optical modulator M10 may be used as a spatial optical modulator (SLM) having excellent performance.

Figure 2:
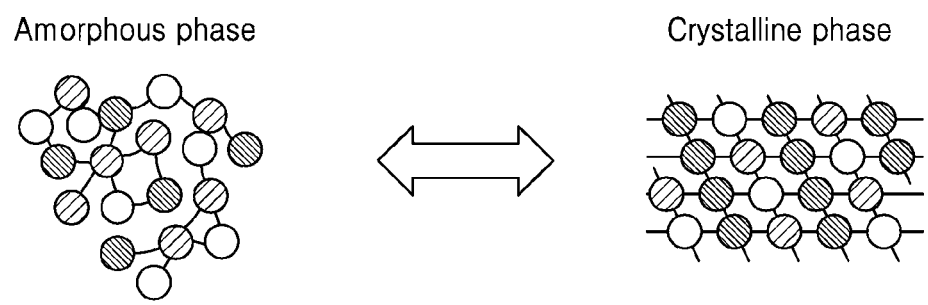
FIG. 2 is a conceptual diagram showing a phase change of a phase change material applied to an optical modulator, according to an exemplary embodiment.

FIG. 2 is a conceptual diagram showing a phase change of a phase change material applied to an optical modulator, according to an embodiment.

Referring to FIG. 2, the phase of the phase change material may be changed between an amorphous phase and a crystalline phase. The phase change may be reversible according to the intensity and duration of an applied voltage. This is described below in detail with reference to FIGS. 3A and 3B.

Figure 3A:
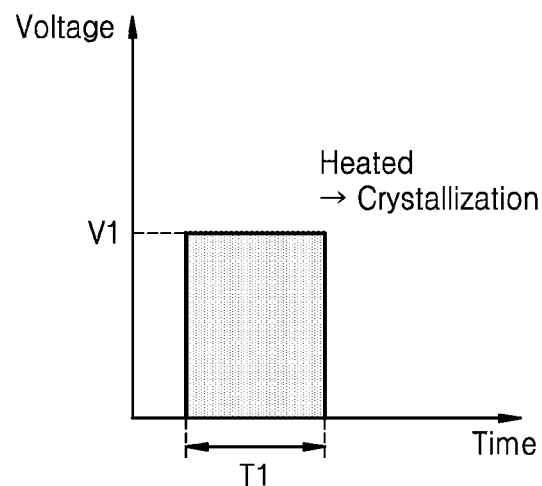
FIG. 3A is a graph showing a voltage applied to a phase change material used for an optical modulator, and a phase change according thereto, according to an exemplary embodiment.

FIG. 3A is a graph showing a voltage applied to a phase change material used for an optical modulator, and a phase change according thereto, according to an embodiment.

Referring to FIG. 3A, a first voltage V1 may be applied to the phase change material in an amorphous phase for a first duration T1. The first voltage V1 may be a set voltage, and the first duration T1 may be, for example, about several tens of nanoseconds (ns) to about several hundreds of nanoseconds. When a phase change material layer (the optical modulation layer) is thin, the first duration T1 may be as short as about 10 ns or less, for example, about several nanoseconds. As the first voltage V1 is applied to the phase change material, the phase change material in the amorphous phase is heated and crystallized to be changed to a crystalline phase.

Figure 3B:
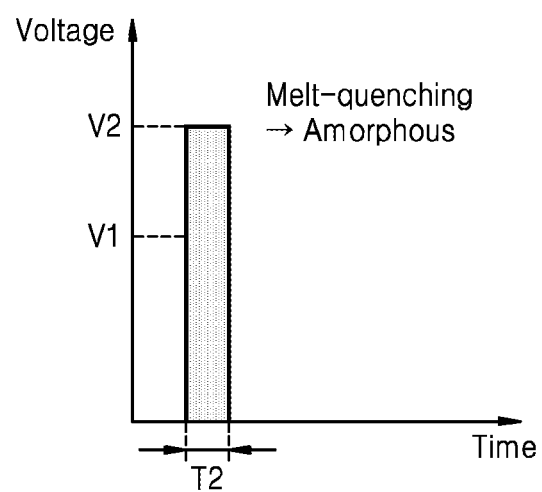
FIG. 3B is a graph showing a voltage applied to a phase change material used for an optical modulator, and a phase change according thereto, according to an exemplary embodiment.

FIG. 3B is a graph showing a voltage applied to a phase change material used for an optical modulator, and a phase change according thereto, according to an exemplary embodiment.

Referring to FIG. 3B, a second voltage V2 may be applied to the phase change material in the crystalline phase for a second duration T2. The second voltage V2 may be a reset voltage and may be greater than the first voltage V1 of FIG. 3A. The second duration T2 may be shorter than the first duration T1 of FIG. 3A. For example, the second duration T2 may be about 10 ns or less and, as the second voltage V2 is applied to the phase change material, the phase change material in the crystalline phase may be melt-quenched to be changed to the amorphous phase.

The first and second voltages V1 and V2 to cause the phase change described with reference to FIGS. 3A and 3B may be as low as about 10 V or less, about 5 V or less, or about 3 V or less.

A refractive index and an absorption rate may be much changed according to the phase change of the phase change material, for example, $Ge_{40}Sb_{10}Te_{50}$. For example, when the phase change material is in the amorphous phase, a complex refractive index may be 4.19+i0.81 (at 780 nm), and when in the crystalline phase, the complex refractive index may be 4.94+i4.41 (at 780 nm). Accordingly, an absorption coefficient may be changed drastically from 0.81 to 4.41 according to the phase change. Furthermore, in an example of another wavelength, when the phase change material is in the amorphous phase, the complex refractive index may be 4.32+i0.37 (at 850 nm), and when in the crystalline phase, the complex refractive index may be 5.67+i4.21 (at 850 nm). Accordingly, the absorption coefficient may be changed drastically from 0.37 to 4.21 according to the phase change. As such, since a change in the absorption coefficient according to the phase change of the phase change material is large, a small thickness may cause a large transmission change.

Figure 4:
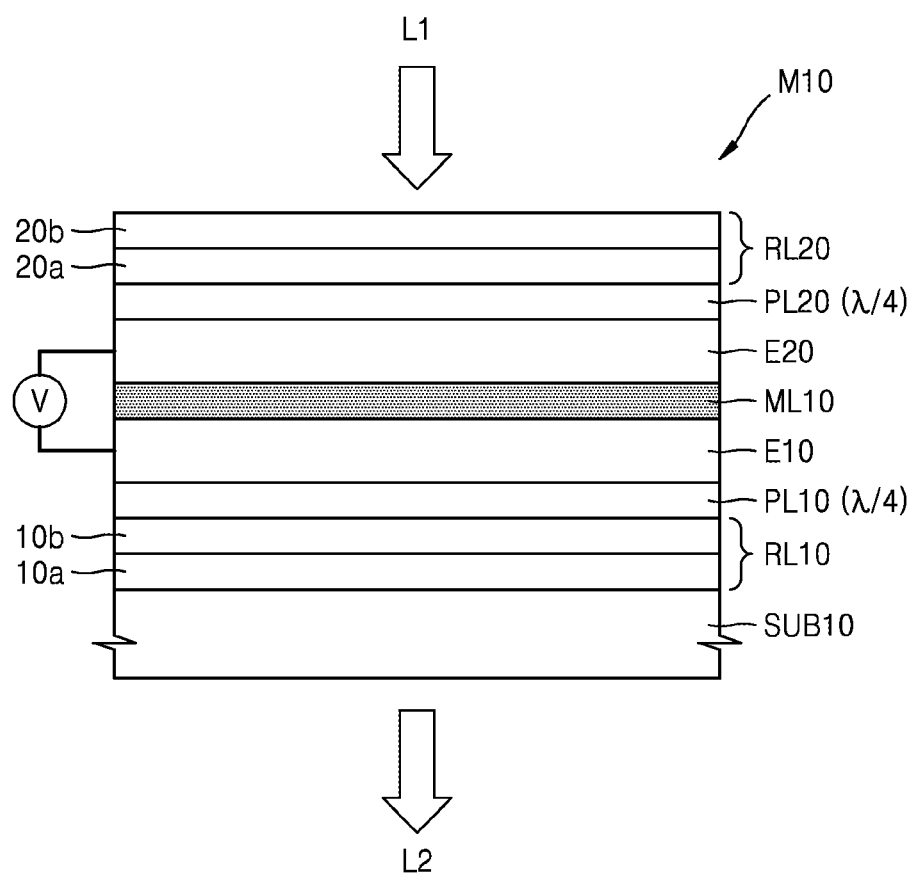
FIG. 4 is a cross-sectional view for explaining modulation of incident light by the optical modulator of FIG. 1.

FIG. 4 is a cross-sectional view for explaining modulation of incident light by the optical modulator M10 of FIG. 1.

Referring to FIG. 4, after incident light L1 is irradiated to the optical modulator M10, exit light L2 having transmitted through the optical modulator M10 may be discharged. As the phase of the optical modulation layer ML10 is changed by applying a certain voltage between the first electrode E10 and the second electrode E20, properties of the exit light L2 may be changed. When the phase change material of the optical modulation layer ML10 is in the amorphous phase, the absorption coefficient may be low and the transmittance of the optical modulator M10 may be high. The transmittance at this state may be referred to as the transmittance $T_{off}$ in an OFF state. In contrast, when the phase change material of the optical modulation layer ML10 is in the crystalline phase, the absorption coefficient may be high and the transmittance of the optical modulator M10 may be low. The transmittance at this state may be referred to as the transmittance $T_{on}$ in an ON state. A difference between the transmittance $T_{off}$ in the OFF state and the transmittance $T_{on}$ in the ON state may be a transmittance change amount $T_{diff}$ or $\Delta T$ and, according to the present exemplary embodiment, may be as high as about 40% or more or about 50% or more.

Figure 5:
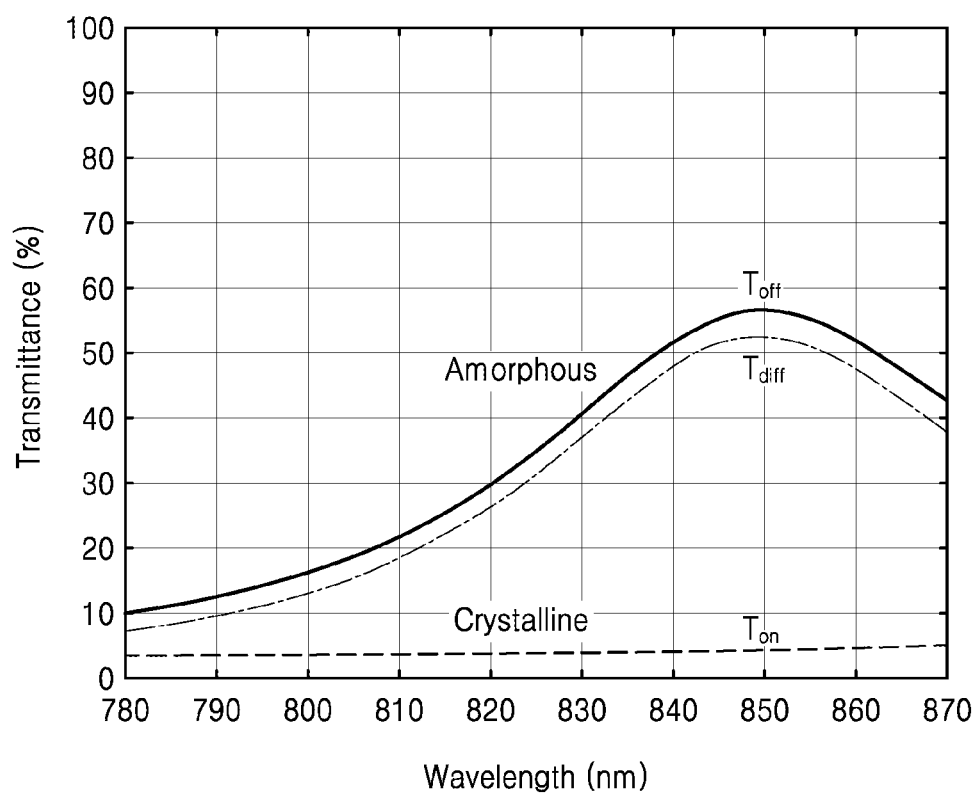
FIG. 5 is a graph showing a transmission properties change due to a phase change of a phase change material of an optical modulator, according to an exemplary embodiment.

FIG. 5 is a graph showing a transmission properties change due to a phase change of the phase change material of an optical modulator, according to an exemplary embodiment in the graph of FIG. 5, the X axis denotes the wavelength of incident light, and the Y axis denotes transmittance of the optical modulator. A result of FIG. 5 is obtained from the optical modulator M10 having the structure of FIG. 4 and in which a glass substrate having a thickness of about 500 μm is used as the substrate SUB10, and the $TiO_2$ layer 10a, the $SiO_2$ layer 10b, the $TiO_2$ layer PL10, the ITO layer E10, the $Ge_{40}Sb_{10}Te_{50}$ layer ML10, the ITO E20, the $TiO_2$ layer PL20, the $SiO_2$ layer 20a, and the $TiO_2$ layer 20b are sequentially provided on the glass substrate. In this state, the thickness of the $Ge_{40}Sb_{10}Te_{50}$ layer ML10 was about 5 nm, and the thickness of each of the ITO layers E10 and E20 was 138 nm.

Referring to FIG. 5, when the phase change material is in the crystalline phase, the transmittance $T_{on}$ of the optical modulator M10 appears to be very low. When the phase change material is in the amorphous phase, the transmittance $T_{off}$ of the optical modulator M10 appears to be relatively very high. In particular, when the wavelength of incident light is about 820 nm or more, the transmittance $T_{off}$ in the OFF state appears to be about 30% or more. When the wavelength is about 830 nm or more, the transmittance $T_{off}$ in the OFF state appears to be about 40% or more. When the wavelength of incident light is in a range of about 840 nm to about 860 nm, the transmittance $T_{off}$ in the OFF state appears to be as high as about 50% or more. Meanwhile, the transmittance $T_{on}$ in the ON state appears to be as very low as about 5% or less in a measurement wavelength range. The transmittance change amount $T_{diff}$, which is a difference between the transmittance $T_{off}$ in the OFF state and the transmittance $T_{on}$ in the ON state, appears to be as high as about 40% in a wavelength range of about 835 nm or more.

It may be seen from the result of FIG. 5 that, when the optical modulator M10 according to the present exemplary embodiment is used, the transmittance change amount $T_{diff}$ as high as about 40% or more or about 50% or more may be obtained. Furthermore, when the D.C. is calculated from the result of FIG. 5, the D.C. may be about 70% or more. A maximum D.C. value obtained from FIG. 5 may be about 86.6%.

In an optical modulator according to the related art, the optical modulator is manufactured by crystal growth (e.g., epitaxial growth) method using group III-V compound semiconductors. The group III-V compound semiconductor based optical modulator has a P-I-N diode structure in which a MQW structure is arranged between a P-electrode and an N-electrode. However, the group III-V compound semiconductor based optical modulator requires a thick absorption layer structure of about several micrometers or more and a complex stacked structure for improving performance. Accordingly, manufacturing process may become more complex, reproducibility of a device may be lowered, and manufacturing costs may be increased. Furthermore, when the epitaxial growth method is used, since there is a limit in the thickness of a semiconductor material to be stacked on the GaAs substrate, the improvement of performance is limited. Also, even when the complex stacked structure is used, there is a limit in increasing a light modulation rate, and it is a problem that the operating voltage is high. For example, according to the related art, an operating voltage of an optical modulator may be about 20 V, a transmittance change amount may be about 30% or less, and the D.C. may be about 30%. When the operating voltage is high, consumption of power increases and optical modulation properties degrade due to driving heat of a device.

In comparison with the optical modulator according to the related art, the optical modulator according to the present exemplary embodiment may have a small thickness and a simple structure, may have a high transmittance change rate of about 40% or more and a high D.C. value of about 70% or more, and may be driven at a low operating voltage of about 10 V or less or about 5 V or less. Furthermore, since the optical modulator may be easily manufactured by a general deposition process, for example, physical vapor deposition, chemical vapor deposition, atomic layer deposition, etc., without a delicate and difficult epitaxial process, the manufacturing process may be less sophisticated and manufacturing costs may be lowered. Furthermore, since the optical modulator may be easily manufactured on various kinds of substrates without being limited to the type of a substrate, manufacturing costs may be reduced and ease of process may be secured.

Figure 6:
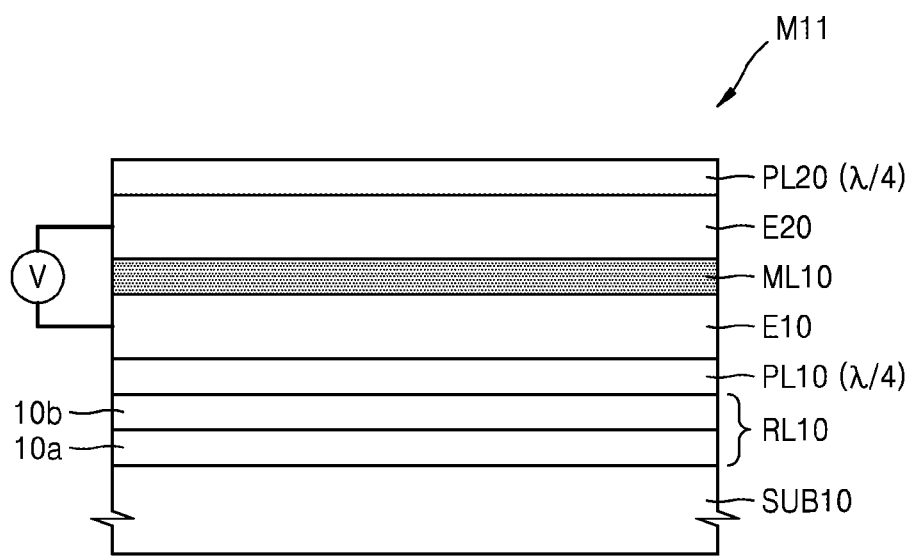
FIG. 6 is a cross-sectional view of an optical modulator according to an exemplary embodiment.
Figure 7:
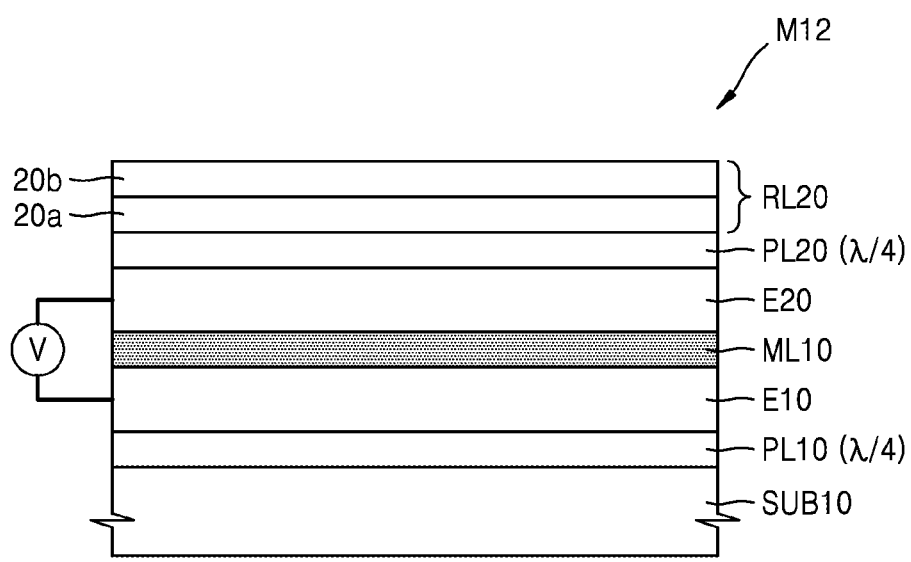
FIG. 7 is a cross-sectional view of an optical modulator according to an exemplary embodiment.

Although, in the exemplary embodiments of FIGS. 1 and 4, a case is described in which the first and second reflective layers RL10 and RL20 are provided at opposite sides (e.g., lower and upper sides) of the optical modulation layer ML10, according to another exemplary embodiment, the reflective layer may be provided only on one side (e.g., lower or upper side) of the optical modulation layer ML10, examples of which are illustrated in FIGS. 6 and 7.

An optical modulator M11 of FIG. 6 may include the first reflective layer RL10 under the optical modulation layer ML10, and no reflective layer may be provided above the optical modulation layer ML10. The first reflective layer RL10 may be provided between the substrate SUB10 and the first phase controlling layer PL10. The structure of FIG. 6 may be the same as the structure of FIG. 1, in which the second reflective layer RL20 is excluded. In the structure of FIG. 6, the second phase controlling layer PL20 may function as an upper reflective layer or function in a similar fashion.

An optical modulator M12 of FIG. 7 may include the second reflective layer RL20 above the optical modulation layer ML10, and no reflective layer may be provided under the optical modulation layer ML10. The second phase controlling layer PL20 may be provided between the second reflective layer RL20 and the second electrode E20. The structure of FIG. 7 may be the same as the structure of FIG. 1 in which the first reflective layer RL10 is excluded. In the structure of FIG. 7, the first phase controlling layer PL10 may function as a lower reflective layer or function in a similar fashion.

Figure 8:
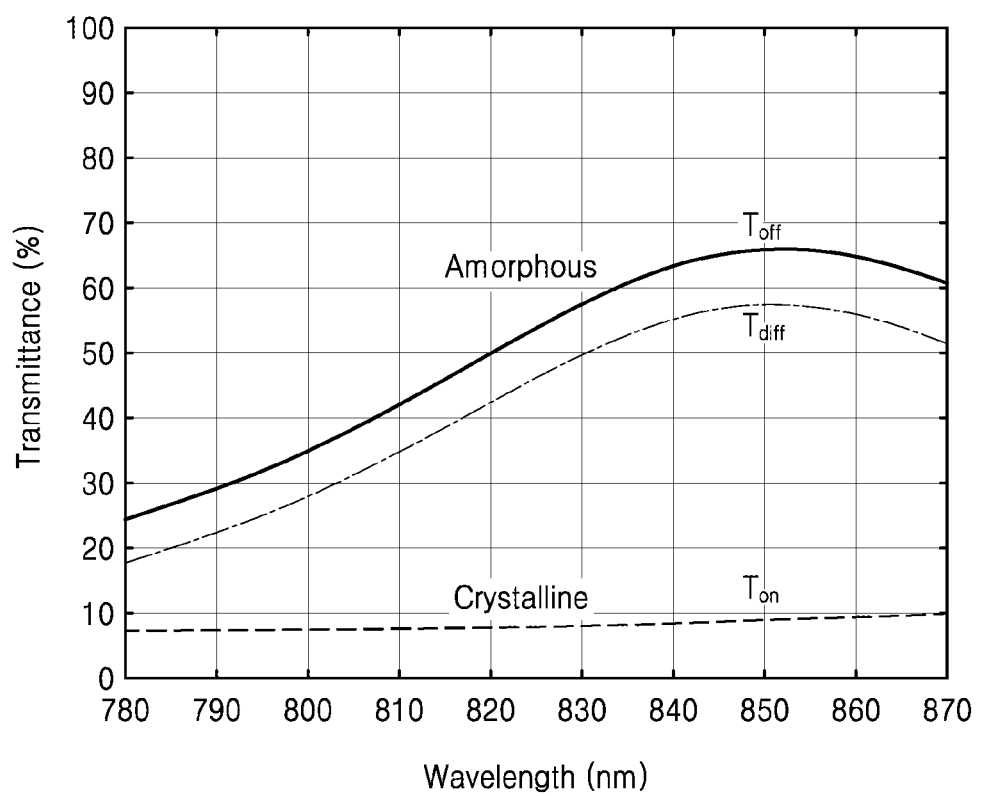
FIG. 8 is a graph showing a transmission properties change due to a phase change of a phase change material of an optical modulator, according to an exemplary embodiment.

FIG. 8 is a graph showing a transmission properties change due to a phase change of a phase change material of an optical modulator, according to an exemplary embodiment. The data of FIG. 8 is a result of measurements performed on the optical modulator M11 of FIG. 6. In other words, FIG. 8 shows a result of the measurements performed on the optical modulator M11, in which a glass substrate having a thickness of about 500 μm is used as the substrate SUB10, and the $TiO_2$ layer 10a, the $SiO_2$ layer 10b, the $TiO_2$ layer PL10, the ITO layer E10, the $Ge_{40}Sb_{10}Te_{50}$ layer ML10, the ITO E20, and the $TiO_2$ layer PL20 are sequentially provided on the glass substrate. In this state, the thickness of the $Ge_{40}Sb_{10}Te_{50}$ layer ML10 is 5 nm and the thickness of each of the ITO layers E10 and E20 is 138 nm.

Referring to FIG. 8, when the phase change material is in the crystalline phase, the transmittance $T_{on}$ of the optical modulator M11 appears to be very low. When the phase change material is in the amorphous phase, the transmittance $T_{off}$ of the optical modulator M11 appears to be relatively very large. The transmittance change amount $T_{diff}$ that is a difference between the transmittance $T_{off}$ in the OFF state and the transmittance $T_{on}$ in the ON state appears to be as high as about 40% or more in a wavelength range of about 820 nm or more. According to the present exemplary embodiment, when the optical modulator M11 is used, a high transmittance change amount $T_{diff}$ of about 40% or more or about 50% or more may be obtained. Furthermore, when the D.C. is calculated from FIG. 8, the D.C. may be about 70% or more. A maximum D.C. was about 86.9%. Accordingly, according to the present exemplary embodiment, the optical modulator M11 may have excellent optical modulation properties.

Figure 9:
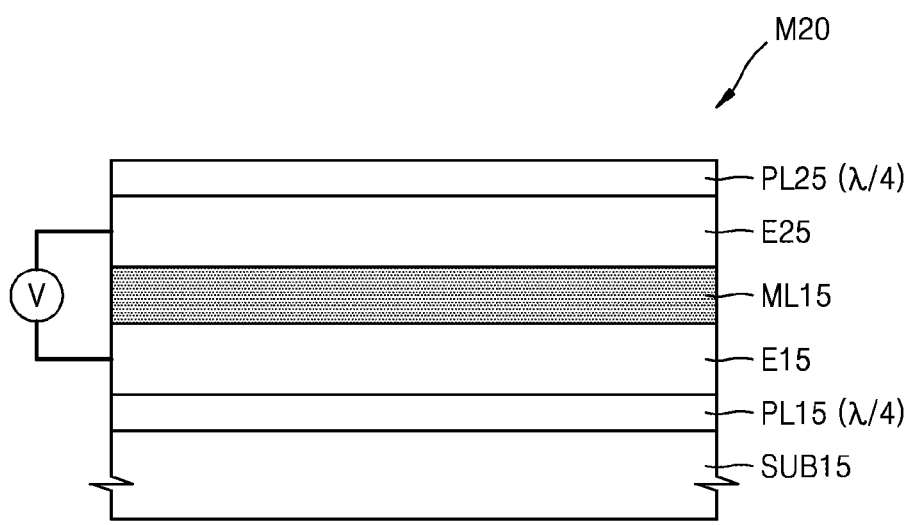
FIG. 9 is a cross-sectional view of an optical modulator according to an exemplary embodiment.

FIG. 9 is a cross-sectional view of an optical modulator M20 according to an exemplary embodiment.

Referring to FIG. 9, the optical modulator M20 may include an optical modulation layer ML15 including the phase change material. A first electrode E15 may be provided on a first surface, for example, a lower surface, of the optical modulation layer ML15. A second electrode E25 may be provided on a second surface, for example, an upper surface, of the optical modulation layer ML15. A first phase controlling layer PL15 may be provided to face the optical modulation layer ML15 with the first electrode E15 therebetween. A second phase controlling layer PL25 may be provided to face the optical modulation layer ML15 with the second electrode E25 therebetween. A substrate SUB15 that is transparent to incident light may be provided. The first phase controlling layer PL15, the first electrode E15, the optical modulation layer ML15, the second electrode E25, and the second phase controlling layer PL25 may be sequentially provided on the substrate SUB15.

The optical modulator M20 according to the present exemplary embodiment may have a structure similar to the structure of the optical modulator M10 of FIG. 1 in which the first reflective layer RL10 and the second reflective layer RL20 are excluded. The optical modulation layer ML15 of the optical modulator M20 may have a thickness that is greater than that of the optical modulation layer ML10 of FIG. 1. For example, the optical modulation layer ML15 may have a thickness of about 10 nm to about 40 nm or about 10 nm to about 30 nm. Considering the thickness of the optical modulation layer ML15, the driving voltage of the optical modulator M20 including the optical modulation layer ML15 may be higher than that of the optical modulator M10 of FIG. 1. However, since the thickness of the optical modulation layer ML15 is as low as about 40 nm or less or about 30 nm or less, the driving voltage (operating voltage) of the optical modulator M20 may be about 10 V or less. Furthermore, a transmittance change amount of the optical modulator M20 may be about 40% or more or about 50% or more, and the D.C. may be about 70% or more or about 80% or more.

The materials of the optical modulation layer ML15, the first electrode E15, the second electrode E25, the first phase controlling layer PL15, the second phase controlling layer PL25, and the substrate SUB15 of FIG. 9, respectively, may be substantially the same as those of the optical modulation layer ML10 of FIG. 1, the first electrode E10, the second electrode E20, the first phase controlling layer PL10, the second phase controlling layer PL20, and the substrate SUB10 of FIG. 1.

Figure 10:
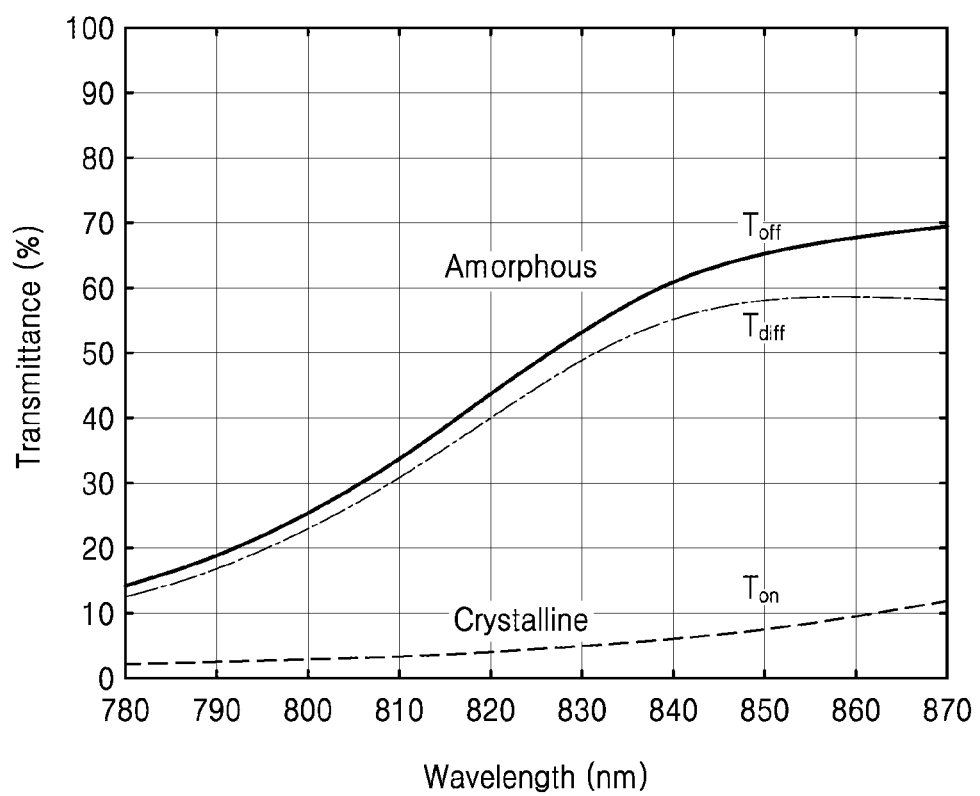
FIG. 10 is a graph showing a transmission properties change due to a phase change of a phase change material of an optical modulator, according to an exemplary embodiment.

FIG. 10 shows a result of measurements performed on the optical modulator M20 of FIG. 9. The result of FIG. 10 is a result of the measurements performed on the optical modulator M20 having the structure of FIG. 9, in which a glass substrate having a thickness of about 500 μm is used as the substrate SUB15, and a $TiO_2$ layer PL15, a ITO layer E15, a $Ge_{40}Sb_{10}Te_{50}$ layer ML15, a ITO layer E25, and a $TiO_2$ layer PL25 are sequentially provided on the glass substrate. In this state, the thickness of the $Ge_{40}Sb_{10}Te_{50}$ layer ML15 was 25 nm and the thickness of the ITO layers E15 and E25 was 385 nm.

Referring to FIG. 10, when the phase change material is in the crystalline phase, the transmittance $T_{on}$ of the optical modulator M20 appears to be very low. When the phase change material is in the amorphous phase, the transmittance $T_{off}$ of the optical modulator M20 appears to be relatively very large. The transmittance change amount $T_{diff}$ that is a difference between the transmittance $T_{off}$ in the OFF state and the transmittance $T_{on}$ in the ON state appears to be as high as about 40% or more in a wavelength range of about 820 nm or more. When the optical modulator M20 according to the present exemplary embodiment is used, a high transmittance change amount $T_{diff}$ of about 40% or more or about 50% or more may be easily secured. Furthermore, when the D.C. is calculated from FIG. 10, the D.C. may be about 70% or more. A maximum D.C. may be about 80.2%.

The transmittance change amounts $T_{diff}$ and the D.C. values of the optical modulators according to the above-described embodiments are summarized as shown in Table 1 below.

TABLE 1

|  | Embodiment 1 (FIG. 1) | Embodiment 2 (FIG. 6) | Embodiment 3 (FIG. 9) |
| --- | --- | --- | --- |
| $T_{diff}$ | ~52.2% | ~57% | ~57.8% |
| D.C. | ~86.6% | ~86.9% | ~80.2% |

As may be seen from Table 1, the transmittance change amount $T_{diff}$ of the optical modulators according to the embodiments may be as high as about 40% or more and the D.C. is as high as about 70% or more. As such, according to the above-described embodiments, an optical modulator having excellent optical modulation properties may be implemented.

Although the above-described optical modulators may be transmissive optical modulators, reflective optical modulators may be used therefor. For example, in the structure of FIG. 4, a high transmittance may signify low reflectance, whereas low transmittance may signify high reflectance. Accordingly, an optical modulator having a high transmittance change amount may be used, in some cases, as a reflective optical modulator. Furthermore, by adjusting a design condition of the material layers constituting an optical modulator, an optical modulator having a large reflectance change amount may be implemented.

Figure 11:
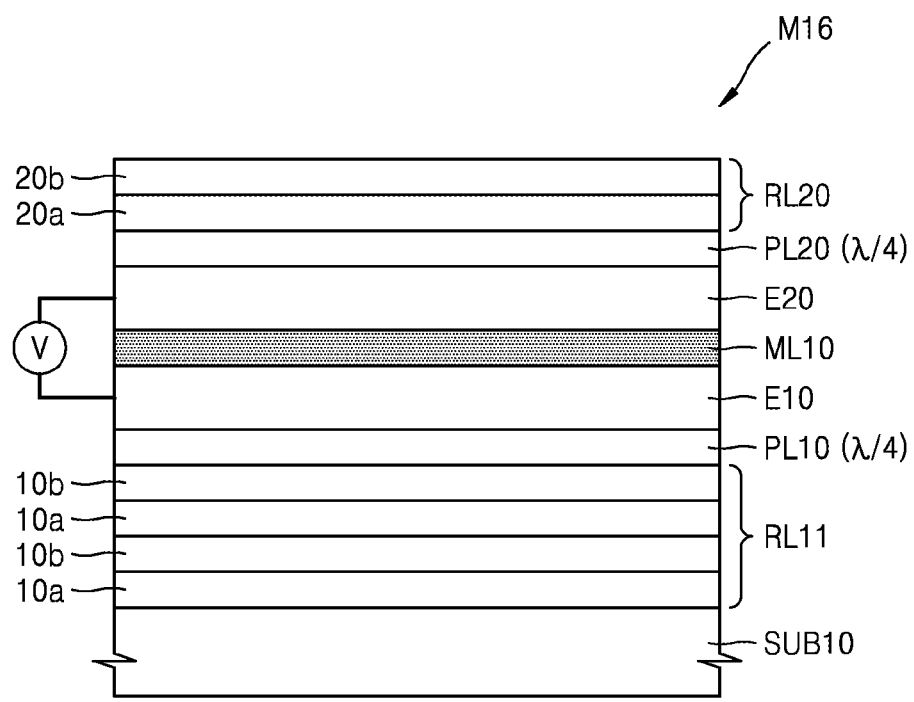
FIG. 11 is a cross-sectional view of an optical modulator according to an exemplary embodiment.
Figure 12:
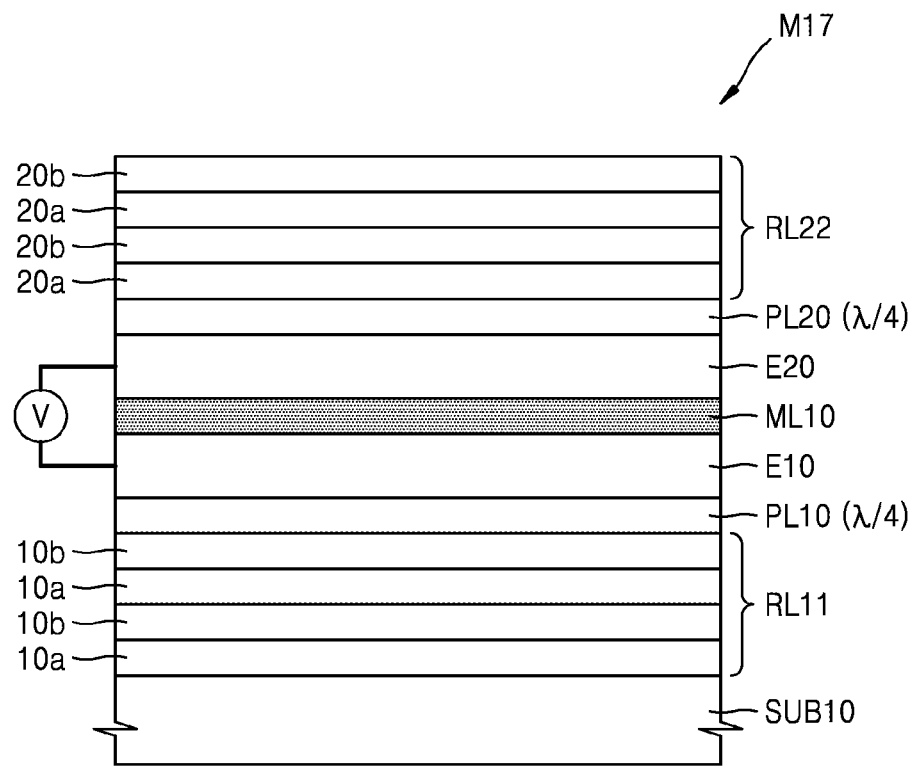
FIG. 12 is a cross-sectional view of an optical modulator according to an exemplary embodiment.
Figure 13:
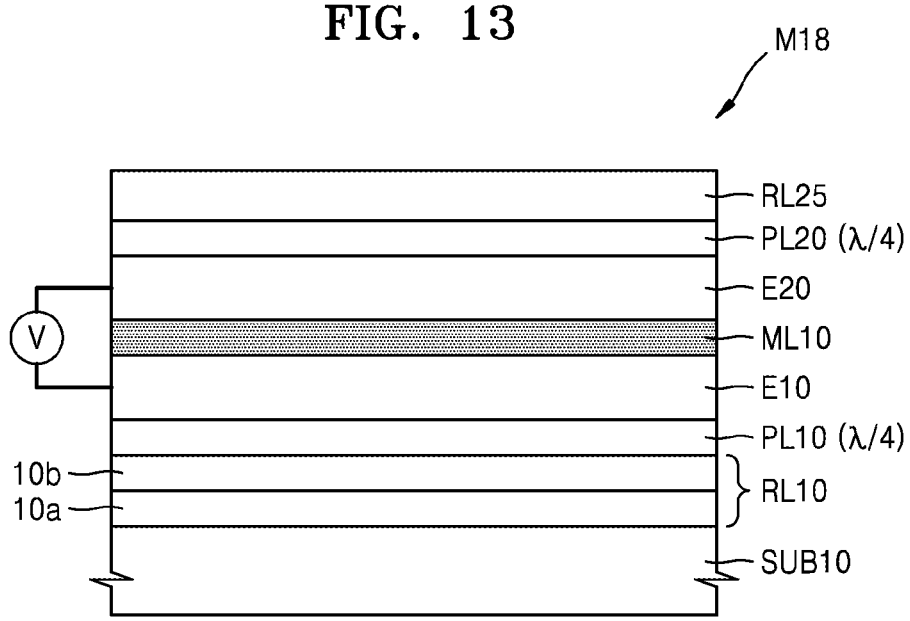
FIG. 13 is a cross-sectional view of an optical modulator according to an exemplary embodiment.

The structures of the optical modulators M10, M11, M12, and M20 according to the exemplary embodiments described with reference to FIGS. 1, 6, 7, and 9 may be changed in various ways and examples thereof are illustrated in FIGS. 11 to 13.

FIG. 11 is a cross-sectional view of an optical modulator M16 according to an exemplary embodiment.

Referring to FIG. 11, the optical modulator M16 may have an asymmetrical structure between a first reflective layer RL11 and the second reflective layer RL20. The number of stacking layers of material layers 10a and 10b constituting the first reflective layer RL11 may be different from the number of stacking layers of material layers 20a and 20b constituting the second reflective layer RL20. Accordingly, the thickness of the first reflective layer RL11 and the thickness of the second reflective layer RL20 may be different from each other. For example, while the first reflective layer RL11 may have a stacked structure of two or more pairs of material layers, the second reflective layer RL20 may have a stacked structure of a less number of pairs of material layers than the first reflective layer RL11. In some cases, while the second reflective layer RL20 may have a stacked structure of two or more pairs, the first reflective layer RL11 may have a stacked structure of a less number of pairs of material layers than the second reflective layer RL20.

As in the present exemplary embodiment, since the first reflective layer RL11 and the second reflective layer RL20 are formed in an asymmetrical structure, different optical properties may be implemented in the upper and lower directions of the optical modulation layer ML10, and thus, the optical modulation properties may be improved or adjusted by using the same.

FIG. 12 is a cross-sectional view of an optical modulator M17 according to an exemplary embodiment.

Referring to FIG. 12, the first reflective layer RL11 and a second reflective layer RL22 of the optical modulator M17 may have a symmetrical structure. In this state, while the first reflective layer RL11 may have a stacked structure of two or more pairs, the second reflective layer RL22 may also have a stacked structure of two or more pairs. The first reflective layer RL11 and the second reflective layer RL22 may have a symmetrical structure with respect to the optical modulation layer ML10.

FIG. 13 is a cross-sectional view of an optical modulator M18 according to an exemplary embodiment.

Referring to FIG. 13, the optical modulator M18 may include the first reflective layer RL10, and further, a second reflective layer RL25. While the first reflective layer RL10 may have a DBR structure, the second reflective layer RL25 may have a structure other than the DBR structure. In other words, while the first reflective layer RL10 may have a stacked structure in which the first material layer 10a and the second material layer 10b having different refractive indexes are alternately and repeatedly stacked one or more times, the second reflective layer RL25 may have a single layer structure. The second reflective layer RL25 may have a structure other than the single layer structure.

Although not illustrated, in FIG. 13, while the second reflective layer RL25 may be formed in the DBR structure, the first reflective layer RL10 may be formed in a structure other than the DBR structure. In other words, in FIG. 13, the positions of the first reflective layer RL10 and the second reflective layer RL25 may be reversed. Furthermore, in some cases, both the first reflective layer RL10 and the second reflective layer RL25 may be formed in a structure other than the DBR structure. In addition, the structures of the optical modulators M10, M11, M12, M16, M17, M18, and M20 may be changed in various ways.

The optical modulators M10, M11, M12, M16, M17, M18, and M20 may be applied to a variety of optical apparatuses. The optical modulators may be implemented in a device capable of adjusting light amount by an external voltage, and furthermore, in a beam steering device capable of adjusting the direction of light. Furthermore, the optical modulators may be applied to a TOF-based 3D camera or 3D sensor using a large-area transmissive optical modulator for obtaining depth/distance information. Furthermore, the optical modulators may be applied to the fields of distance detection sensors for autonomous mobile robots/automobiles, displays, 3D printing, etc. Furthermore, the optical modulators may be used for optical communication systems requiring high-speed/low-power, optical signal processing apparatuses or optical arithmetic units requiring high-speed operation, etc. Furthermore, since the optical modulators may be easily manufactured on a flexible substrate, the optical modulators may be applied to the fields of flexible devices or wearable devices.

Figure 14:
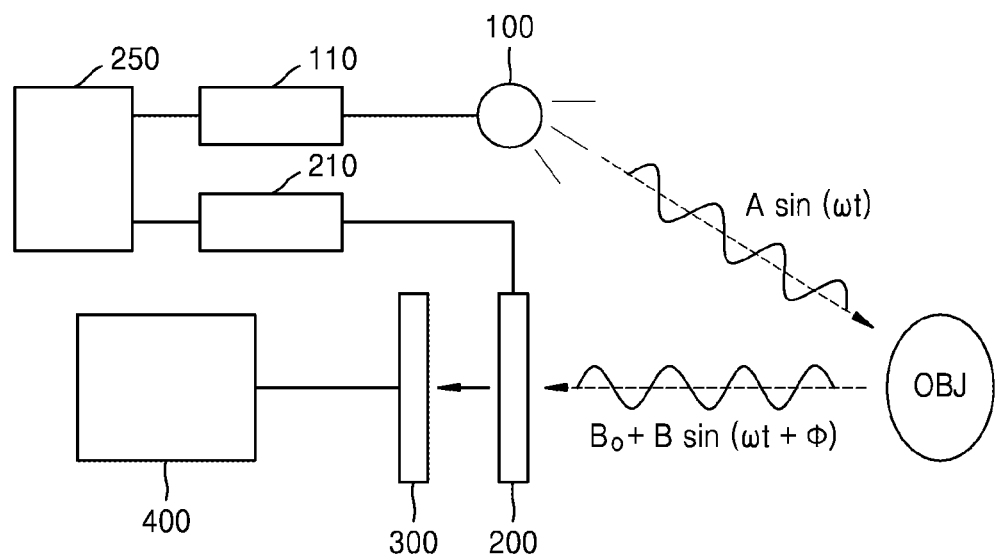
FIG. 14 is a block diagram schematically illustrating an exemplary structure of a 3D image acquiring device including an optical modulator, according to an exemplary embodiment.

FIG. 14 is a block diagram schematically illustrating an exemplary structure of a 3D image acquiring device including an optical modulator, according to an exemplary embodiment. The 3D image acquiring device according to the present exemplary embodiment may be a TOF-based 3D imaging apparatus.

Referring to FIG. 14, the 3D image acquiring device may include a light source unit 100 emitting light to an object OBJ. The light source unit 100 may generate light having a certain wavelength. A first driver 110 for driving the light source unit 100 may be provided.

The 3D image acquiring device may include an optical modulation unit 200 for modulating light reflected from the object OBJ. The optical modulation unit 200 may include any one of the optical modulators according to the above-described exemplary embodiments with reference to FIGS. 1 to 13. In some cases, the optical modulation unit 200 may include a plurality of optical modulators. A second driver 210 for driving the optical modulation unit 200 may be provided. Furthermore, a controller 250 for controlling operations of the first and second drivers 110 and 210 may be further provided.

The 3D image acquiring device may include a light detection unit 300 for detecting light modulated by the optical modulation unit 200. The light detection unit 300 may include an imaging device for generating an image from modulated light. An operation unit (calculation unit) 400 connected to the light detection unit 300 and calculating a distance to the object OBJ may be further provided.

At least one optical element such as a lens, a filter, or a mirror may be further provided between the object OBJ and the optical modulation unit 200 and/or between the optical modulation unit 200 and the light detection unit 300.

The light source unit 100 may be, for example, a light-emitting diode (LED) or a laser diode (LD) for emitting an infrared ray (IR) of a wavelength of about 940 nm that is invisible to human eyes for the purpose of safety. The first driver 110 may drive the light source unit 100 according to a control signal received from the controller 250 to emit a periodic wave, for example, a sine wave. The light emitted from the light source unit 100 to the object OBJ may be reflected from the object OBJ and then incident on the optical modulation unit 200. When a lens (e.g., objective lens) is arranged between the optical modulation unit 200 and the object OBJ, the light (i.e., light reflected from the object) may be focused by the lens (e.g., objective lens) at the optical modulation unit 200. The optical modulation unit 200 may modulate the incident light to an optical modulation signal having a certain waveform by the control of the second driver 210. The second driver 210 may control an optical modulation signal of the optical modulation unit 200 according to the control signal received from the controller 250. The light modulated by the optical modulation unit 200 may be incident on the light detection unit (e.g., imaging device) 300. When a certain filter is arranged between the optical modulation unit 200 and the light detection unit 300, external component other than the 940 nm IR may be removed by the filter. The light detection unit 300 may generate an image containing distance information by photographing the light modulated by the optical modulation unit 200. For example, the light detection unit 300 may include a charge coupled device (CCD) image sensor or a complementary metal oxide semiconductor (CMOS) image sensor having a 2D array. The operation unit 400 may calculate a distance to the object OBJ according to a well-known distance calculation algorithm based on an output of the light detection unit 300.

Figure 15:
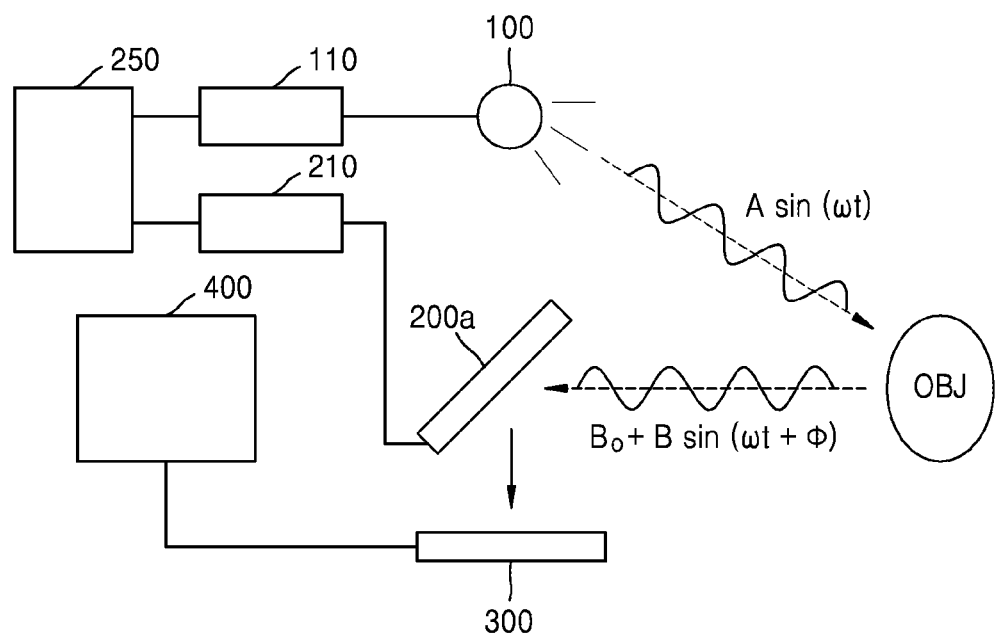
FIG. 15 is a block diagram schematically illustrating an exemplary structure of a 3D image acquiring device including an optical modulator, according to an exemplary embodiment.

Although, in the embodiment of FIG. 14, the optical modulation unit 200 is of a transmissive type, according to another exemplary embodiment, a reflective optical modulation unit may be used and an example thereof is illustrated in FIG. 15. In FIG. 15, the optical modulation unit 200a may be of a reflective type, and the light modulated by the optical modulation unit 200a may be incident on the light detection unit 300. If needed, one or more optical elements such as a mirror, a filter, or a lens between the optical modulation unit 200a and the light detection unit 300. The other structure except for the optical modulation unit 200a and a relative arrangement relation between the optical modulation unit 200a and the light detection unit 300 may be substantially the same as the structure of FIG. 14.

In FIGS. 14 and 15, the relative arrangement or connection relation of the constituent elements is merely exemplary, and the structure of the 3D image acquiring device may be changed in various ways. Furthermore, the optical modulators according to the above-described embodiments may be applied not only to the 3D image acquiring device of FIGS. 14 and 15, but also to various other optical apparatuses. Furthermore, although in the above descriptions the optical modulators are mainly used in the IR wavelength range, a usable wavelength range may be changed without being limited to the IR range.

Many details are described in detail in the description, but they should be construed as illustrative examples of specific embodiments rather than limiting the scope of the disclosure. For example, those skilled in the art will appreciate that the configuration of the optical modulator described with reference to FIGS. 1 to 13 can be varied in various ways. In a detailed example, it may be seen that the phase change material and other materials may be applied to the optical modulation layer of the optical modulator, and a plug structure may be applied to at least one of the first and second electrodes (e.g., lower and upper electrodes). In addition, the configuration of the optical modulator and the configuration of the optical modulator array may be changed in various ways. The optical apparatus, to which the optical modulator or the optical modulator array are applied, may be changed in various ways without being limited to the apparatuses of FIGS. 14 and 15. Therefore, the scope of the invention is not to be determined by the above-described embodiments, but by the technical concept set forth in the claims.

It should be understood that exemplary embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope as defined by the following claims.

What is claimed is:
1. An optical modulator comprising:
an optical modulation layer comprising a phase change material;
a first electrode disposed on a first surface of the optical modulation layer;
a second electrode disposed on a second surface of the optical modulation layer;
a first phase controlling layer, the first electrode being disposed between the first phase controlling layer and the optical modulation layer;
a second phase controlling layer, the second electrode being disposed between the second phase controlling layer and the optical modulation layer; and
a first reflective layer, the first phase controlling layer being disposed between the first reflective layer and the first electrode,
wherein a center wavelength of incident light to be modulated by the optical modulator is $\lambda$,
wherein each of the first and the second phase controlling layers has an optical thickness corresponding to an odd multiple of $\lambda/4$, and
wherein the optical modulator is configured to modulate the incident light by a change in optical properties of the optical modulation layer based on a phase change of the phase change material.

2. The optical modulator of claim 1, wherein the optical modulation layer has a thickness of 10 nm or less.

3. The optical modulator of claim 1, wherein the optical modulator is configured to operate at an operating voltage of 10 V or less.

4. The optical modulator of claim 1, wherein the optical modulator is configured to operate at an operating voltage of 5 V or less.

5. The optical modulator of claim 1, wherein the phase change material comprises $Ge_{40}Sb_{10}Te_{50}$.

6. The optical modulator of claim 1, wherein at least one from among the first and the second electrodes comprises a transparent conductive oxide (TCO).

7. The optical modulator of claim 1, wherein an overall optical thickness of the optical modulation layer and the first and the second electrodes satisfies a condition of an integer multiple of $\lambda/2$.

8. The optical modulator of claim 1, wherein at least one from among the first and the second phase controlling layers comprises one from among $TiO_2$, $SiO_2$, SiNx, $Al_2O_3$, AlN, $HfO_2$, SiC, and MgO.

9. The optical modulator of claim 1, further comprising a second reflective layer, the second phase controlling layer being disposed between the second reflective layer and the second electrode, wherein the first reflective layer comprises a first distributed Bragg reflector (DBR) and the second reflective layer comprises a second DBR.

10. The optical modulator of claim 9, wherein at least one from among the first DBR and the second DBR has a stacked structure in which a first material layer, which has a first refractive index, and a second material layer, which has a second refractive index that is different from the first refractive index, are alternatingly stacked.

11. The optical modulator of claim 1, further comprising a substrate that is transparent to incident light,
wherein the first phase controlling layer, the first electrode, the optical modulation layer, the second electrode, and the second phase controlling layer are sequentially stacked on the substrate.

12. The optical modulator of claim 1, wherein the optical modulator is a transmissive optical modulator using a transmittance change according to the phase change of the phase change material.

13. The optical modulator of claim 1, wherein a transmittance change amount of the optical modulator is 40% or more.

14. The optical modulator of claim 1, wherein a demodulation contrast (D.C.) of the optical modulator is 70% or more.

15. An optical apparatus comprising the optical modulator defined in claim 1.

16. A three-dimensional (3D) image acquiring device comprising:
a light source unit configured to emit light to an object;
an optical modulation unit configured to modulate light reflected from the object and comprising the optical modulator defined in claim 1; and
a light detection unit configured to detect light modulated by the optical modulation unit.

17. The optical modulator of claim 1, wherein the phase change material of the optical modulation layer is a Ge—Sb—Te-based material.

18. The optical modulator of claim 17, wherein the Ge—Sb—Te-based material is expressed as $Ge_xSb_yTe_z$, where x, y, and z are positive integers and x>y, y<z, and x<z.

19. The optical modulator of claim 1, wherein the first phase controlling layer and the second phase controlling layer are configured to match phases of the incident light.

20. The optical modulator of claim 1, wherein at least one from among the first phase controlling layer and the second phase controlling layer is a dielectric layer.

21. The optical modulator of claim 1, wherein the first reflective layer comprises a distributed Bragg reflector (DBR) structure, in which two material layers, which have different refractive indexes from each other, are alternatingly stacked, and
wherein the two material layers comprise different dielectrics selected from a group consisting of TiO2, SiO2, SiNx, $Al_2O_3$, AlN, HfO2, SiC, and MgO.

22. The optical modulator of claim 21, wherein each of the two material layers has an optical thickness corresponding to an integer multiple of $\lambda/4$.

23. An optical modulator comprising:
an optical modulation layer including a phase change material;
a first electrode disposed on a first surface of the optical modulation layer;
a second electrode disposed on a second surface of the optical modulation layer;
a first phase controlling layer, the first electrode being disposed between the first phase controlling layer and the optical modulation layer;
a second phase controlling layer, the second electrode being disposed between the second phase controlling layer and the optical modulation layer; and
a first reflective layer, the first phase controlling layer being disposed between the first reflective layer and the first electrode,
wherein a center wavelength of incident light to be modulated by the optical modulator is $\lambda$,
wherein each of the first and the second phase controlling layers has an optical thickness corresponding to an odd multiple of $\lambda/4$, and an overall optical thickness of the optical modulation layer and the first and the second electrodes is an integer multiple of $\lambda/2$, and
wherein the optical modulator is configured to modulate the incident light by a change in optical properties of the optical modulation layer based on a phase change of the phase change material.

24. The optical modulator of claim 23, wherein a thickness of the optical modulation layer ranges from 10 nm to 40 nm.

25. The optical modulator of claim 23, wherein the phase change material comprises $Ge_{40}Sb_{10}Te_{50}$.

26. The optical modulator of claim 23, wherein at least one from among the first and the second electrodes comprises a transparent conductive oxide (TCO).

27. The optical modulator of claim 23, wherein at least one from among the first and the second phase controlling layers comprises one from among $TiO_2$, $SiO_2$, SiNx, $Al_2O_3$, AlN, $HfO_2$, SiC, and MgO.

28. The optical modulator of claim 23, further comprising a second reflective layer, the second phase controlling layer being disposed between the second reflective layer and the second electrode,
wherein the first reflective layer is a first distributed Bragg reflector (DBR), and
wherein the second reflective layer is a second DBR.

29. The optical modulator of claim 28, wherein the optical modulation layer has a thickness of 10 nm or less, and an operating voltage of the optical modulator is 10 V or less.

30. The optical modulator of claim 23, wherein a transmittance change amount of the optical modulator is 40% or more.

31. The optical modulator of claim 23, wherein a demodulation contrast (D.C.) of the optical modulator is 70% or more.

32. An optical apparatus comprising the optical modulator defined in claim 23.

33. A three-dimensional (3D) image acquiring device comprising:
a light source unit configured to emit light to an object;
an optical modulation unit configured to modulate light reflected from the object and comprising the optical modulator defined in claim 23; and
a light detection unit configured to detect light modulated by the optical modulation unit.

* * * * *